United States Patent

Hopp et al.

[11] 3,856,815
[45] Dec. 24, 1974

[54] PROCESS FOR THE PRODUCTION OF OXA-BICYCLO ALKENES

[75] Inventors: Rudolf Hopp; Kurt Bauer, both of Holzminden, Germany

[73] Assignee: Haarmann & Reimer GmbH, Holzminden, Germany

[22] Filed: July 21, 1972

[21] Appl. No.: 274,133

[30] Foreign Application Priority Data
July 21, 1971 Germany............................ 2136496

[52] U.S. Cl................ 260/333, 260/345.2, 204/158
[51] Int. Cl. ........................... C07d 9/00, C07d 7/20
[58] Field of Search............. 260/333, 345.2, 346.2; 204/158

Primary Examiner—Norma S. Milestone
Attorney, Agent, or Firm—Burgess, Dinklage & Sprung

[57] ABSTRACT

Oxa-bicyclo alkene compounds are prepared by reacting a saturated cyclic ketone of from 11 to 15 ring carbon atoms, with a compound corresponding to the general formula (I):

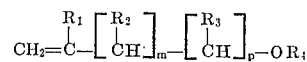

in which $R_1$, $R_2$ and $R_3$, which may be the same or different, are hydrogen, methyl or ethyl;

$m$ and $p$, which may be the same or different, are 0 to 1;

$R_4$, when $m$ and $p = 0$, is a lower aliphatic carboxylic acid radical or, when at least one of $m$ and $p$ is 1, $R_4$ is a lower aliphatic carboxylic acid or hydrogen, in a radical initiated reaction.

14 Claims, No Drawings

PROCESS FOR THE PRODUCTION OF OXA-BICYCLO ALKENES

This invention relates to a process for the production of oxa-bicyclo alkene compounds from cyclic ketones and either alkenols or alkenyl esters.

In one known process for the production of oxa-bicyclo alkenes (described in German Offenlegungsschrift (DOS) No. 2,026,056), these compounds can only be prepared through a complicated synthesis involving several stages. Because of this expense, it has hitherto not been economical to employ oxa-bicyclo alkenes as odorant components or as intermediate products in the synthesis of odorants.

We have now found that oxa-bicyclo alkenes can readily be obtained by reacting a saturated cyclic ketone of from 11 to 15 ring carbon atoms, with a compound corresponding to the general formula (I):

in which $R_1$, $R_2$ and $R_3$, which may be the same or different, are hydrogen, methyl or ethyl;

$m$ and $p$, which may be the same or different, are 0 to 1;

$R_4$, when m and p = 0, is a lower aliphatic carboxylic acid radical or, when at least one of $m$ and $p$ is 1, $R_4$ is a lower aliphatic carboxylic acid or hydrogen. In the process of the invention, these reactants are subjected to a radical initiated reaction; following completion of said reaction the excess cyclic ketone is separated; and, if $R_4$ is a lower aliphatic carboxylic acid radical, the residue is hydrolyzed; subsequently, the reaction mixture is treated with a catalytic quantity of an acid catalyst to form an oxa-bicyclo alkene which can readily be separated off from the reaction mixture.

Cyclo-undecanone, cyclododecanone, cyclotridecanone, cyclotetradecanone and cyclopentadecanone are illustrative of the saturated cyclic ketones in the process according to the invention.

Compounds of general formula (1) are referred to hereinafter as alkenols when $R_4$ is hydrogen, and as alkenyl esters when $R_4$ is the radical of a lower aliphatic carboxylic acid.

Lower aliphatic carboxylic acids are preferably carboxylic acids of from 1 to 3 carbon atoms, e.g. formic acid, acetic acid and propionic acid.

The following are exemplary of suitable alkenols of Formula I:

1-propen-3-ol, 2methyl-1-propen-3-ol, 2-ethyl-1-propen-3-ol, 1-buten-3-ol, 2-methyl-1-buten-3-ol, 2-ethyl-1-buten-3-ol, 1-penten-3-ol, 2-methyl-1-penten-3-ol, 2-ethyl-1-penten-3-ol, 1-buten-4-ol, 2-methyl-1-buten-4-ol, 3-methyl-1-buten-4-ol, 2-ethyl-1-buten-4-ol, 3-ethyl-1-buten-4-ol, 2,3-dimethyl-1-buten-4-ol, 2-methyl-3-ethyl-1-buten-4-ol, 2-ethyl-3-methyl-1-buten-4-ol, 2,3-diethyl-1-buten-4-ol, 1-penten-4-ol, 2-methyl-1-penten-4-ol, 3-methyl-1-penten-4-ol, 2-ethyl-1-penten-4-ol, 3-ethyl-1-penten-4-ol, 2,3-dimethyl-1-penten-4-ol, 2-methyl-3-ethyl-1-penten-4-ol, 2-ethyl-3-methyl-1-penten-4-ol, 2,3-diethyl-1-penten-4-ol, 1-hexen-4-ol, 2-methyl-1-hexen-4-ol, 3-methyl-1-hexen-4-ol, 2-ethyl-1-hexen-4-ol, 3-ethyl-1-hexen-4-ol, 2,3-dimethyl-1-hexen-4-ol, 2-methyl-3-ethyl-1-hexen-4-ol, 2-ethyl-3-methyl-1-hexen-4-ol, 2,3-diethyl-1-hexen-4-ol.

The acetic acid esters are preferably used as the alkenyl esters of general formula I.

The following are mentioned as examples of alkenyl esters (of Formula I):

Vinyl acetate, 1-propen-2-yl-acetate, 1-buten-2-yl-acetate, 1-propen-3-yl-acetate, 2-methyl-1-propen-3-yl-acetate, 2-ethyl-1-propen-3-yl-acetate, 1-buten-3-yl-acetate, 2-methyl-1-buten-3-yl-acetate, 2-ethyl-1-buten-3-yl-acetate, 1-penten-3-yl-acetate, 2-methyl-1-penten-3-yl-acetate, 2-ethyl-1-penten-3-yl-acetate, 1-buten-4-yl-acetate, 2-methyl-1-buten-4-yl-acetate, 3-methyl-1-buten-4-yl-acetate, 2-ethyl-1-buten-4-yl-acetate, 3-ethyl-1-buten-4-yl-acetate, 2,3-dimethyl-1-buten-4-yl-acetate, 2-methyl-3-ethyl-1-buten-4-yl-acetate, 2-ethyl-3-methyl-1-buten-4-yl-acetate, 2,3-diethyl-1-buten-4-yl-acetate, 1-penten-4-yl-acetate, 2-methyl-1-penten-4-yl-acetate, 3-methyl-1-penten-4-yl-acetate, 2-ethyl-1-penten-4-yl-acetate, 3-ethyl-1-penten-4-yl-acetate, 2,3-dimethyl-1-penten-4-yl-acetate 2-methyl-3-ethyl-1-penten-4-yl-acetate, 2-ethyl-3-methyl-1-penten-4-yl-acetate. 2,3-diethyl-1-penten-4-yl-acetate, 1-hexen-4-yl-acetate, 2-methyl-1-hexen-4-yl-acetate, 3-methyl-1-hexen-4-yl-acetate, 2-ethyl-1-hexen-4-yl-acetate, 3-ethyl-1-hexen-4-yl-acetate, 2,3-dimethyl-1-hexen-4-yl-acetate, 2-methyl-3-ethyl-1-hexen-4-yl-acetate, 2-ethyl-3-methyl-1-hexen-4-yl-acetate, 2,3-diethyl-1-hexen-4-yl-acetate.

The starting compounds used for the reaction by the process according to the invention are preferably selected from the group of saturated cyclic ketones and from the group of compounds of general formula I in such a way that the total sum of the carbon atoms of the cyclic ketone and those carbon atoms of the general formula compound which link the oxygen atom and the terminal methylene group (including the carbon atom of the methylene group) in formula I, is equal to 14, 15 or 16.

Accordingly, the following alkenols or alkenyl esters for example are preferably used:

When cyclo-undecanone is used as the ketone: 1-propen-3-ol, 1-buten-3-ol, 1-penten-3-ol and the aforementioned alkyl-substituted 1-propen-3ol, 1-buten-3-ol and 1-penten-3-ol derivatives or the aforementioned acetates of these compounds, also 1-buten-4-ol, 1-penten-4-ol, 1-hexen-4-ol and the aforementioned alkyl-substituted 1-buten-4-ol, 1-penten-4-ol and 1-hexen-4-ol derivatives or the corresponding aforementioned acetates of these compounds.

When cyclododecanone is used: vinyl acetate, 1-propen-2-ol-acetate and 1-buten-2-ol-acetate, also 1-propen-3-ol, 1-buten-3-ol, 1-penten-3-ol and the aforementioned alkyl-substituted 1-propen-3-ol, 1-buten-3-ol and 1-penten-3-ol derivatives or the corresponding aforementioned acetates of these compounds, also 1-buten-4-ol, 1-penten-4-ol, 1-hexen-4-ol, and the aforementioned alkyl-substituted 1-buten-4-ol, 1-penten-4-ol and 1-hexen-4-ol derivatives or the corresponding aforementioned acetates of these compounds.

When cyclotridecanone is used: vinyl acetate, 1-propen-2-ol-acetate and 1-buten-2-ol-acetate, also 1-propen-3-ol, 1-buten-3-ol, 1-penten-3-ol and the aforementioned alkyl-substituted 1-propen-3-ol, 1-buten-3-ol and 1-penten-3-ol derivatives or the corresponding aforementioned acetates of these compounds.

The reactants are more preferably selected in such a way that the aforementioned sum of carbon atoms is equal to 15; cyclododecanone is most preferably used as the cyclo alkanone so that the Formula I compound preferably contains three linear carbons (i.e., one of $m$ and $p$ is 0).

When using cyclododecanone as the cyclic ketone, then the use of 1-propen-3-ol, 2-methyl-1-propen-3-ol or 1-buten-3-ol and 1-propen-3-yl-acetate, 2-methyl-1-propen-3-yl-acetate or 1-buten-3-yl-acetate as alkenol and alkenyl ester, respectively, is also particularly preferred.

The compounds used as alkenols and alkenyl esters are known compounds or can be obtained by known methods. Beilstein discloses 1-propen-3-ol (Vol. 1, page 436), 2-methyl-1-propen-3-ol (Vol. 1, 1st Suppl. Vol., page 227), 2-ethyl-1-propen-3-ol (Vol. 1, page 444), 1-buten-3-ol (Vol. 1, page 441), 2-methyl-1-buten-3-ol (Vol. 1, 1st Suppl. Vol., page 228), 1-penten-3-ol (Vol. 1, page 443), 1-buten-3-ol (Vol. 1, page 441), 2-methyl-1-buten-4-ol (Vol. 1, 3rd Suppl. Vol., page 1930), 3-methyl-1-buten-4-ol (Vol. 1, 3rd Suppl. Vol., page 1932), 1-penten-4-ol (Vol. 1, page 443), 1-hexen-4-ol (Vol. 1, page 444), 3-methyl-1-hexen-4-ol (Vol. 1, 3rd Suppl. Vol., page 1940), vinyl acetate (Vol. 2, 1st Suppl. Vol., page 63), 1-propen-2-yl-acetate (Vol. 2, 3rd Suppl. Vol., page 278), 1-buten-2-yl-acetate (Vol. 2, 3rd Suppl. Vol., page 282), 2-methyl-1-propen-3-yl-acetate (Vol. 2, page 137), 1-buten-3-yl-acetate (Vol. 2, 3rd Suppl. Vol., page 282), 2-methyl-1-buten-3-yl-acetate (Vol. 2, page 137), 1-penten-3-yl-acetate (Vol. 2, page 137), 1-buten-4-yl-acetate (Vol. 2, page 137), 2-methyl-1-buten-4-yl-acetate (Vol. 2, 1st Suppl. Vol., page 64), 1-penten-4-yl-acetate (Vol. 2, page 137), 2-methyl-1-penten-4-yl-acetate (Vol. 2, 3rd Suppl. Vol., page 288), 1-hexen-4-yl-acetate (Vol. 2, page 138), cyclo-undecanone (Vol. 7, 2nd Suppl. Vol., page 45), cyclododecanone (Vol. 7, 2nd Suppl. Vol., page 48), cyclotridecanone (Vol. 7, 2nd Suppl. Vol., page 49), cyclotetradecanone (Vol. 7, 2nd Suppl. Vol., page 49), cyclopentadecanone (Vol. 7, 2nd Suppl. Vol., page 50).

Formation of the oxa-bicyclo alkenes by the process according to the invention is illustrated in the following with reference to the example of the reaction of cyclododecanone with 1-buten-4-ol:

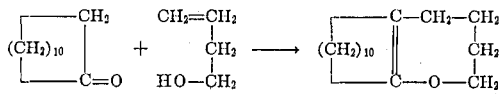

The oxa-bicyclo alkenes formed by the process according to the invention can be described by the following formula:

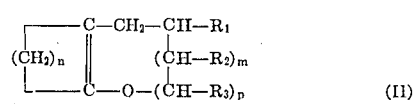

in which $R_1$, $R_2$ or $R_3$ which may be the same or different represent a hydrogen atom or a methyl or ethyl radical, $n$ is an integer of from 9 to 13, $m$ and $p$ which may be the same or different represent 0 or 1.

In cases where aliphatic alkenols are used as reaction components, the process according to the invention is preferably carried out in the absence of a solvent. However, in cases where aliphatic alkenyl esters are used, the additionally necessary hydrolysis of the reaction mixture is best carried out in alcoholic solution.

It has proved to be advantageous to use the cycloalkanone in excess, about 1.5 mols to 10 mols of the cyclo alkanone and preferably 4 to 6 mols being used per mol of the alkenol or alkenyl ester.

The reaction on which the process according to the invention is based is generally carried out at a temperature in the range of from 0°C to 200°C.

The reaction can be radically initiated by means of radical initiators, i.e. compounds which give off radicals when heated, or by means of high-energy radiation, for example UV-radiation.

Basically, any chemical compounds which give off radicals at the reaction temperature, preferably when heated to from 40° to 200°C, can be used as radical initiators. In general, it has proved to be advantageous to use dialkyl or diacyl peroxides, for example di-tert.-butyl peroxide, dibenzoyl peroxide or azo-bis-nitriles, for example azo-bis-isobutyronitrile. It has proved to be particular advantageous to use di-tert.-butyl peroxide.

Accordingly, the reaction temperatures are situated at the decomposition temperatures of the radical initiators, generally in the range of from 40° to 200°C. For example, where di-tert.-butyl peroxide is used, the reaction temperature is in the range from 120° to 200°C and preferably in the range from 130° to 160°C and where benzoyl peroxide is used in the range from 100° to 175°C, preferably from 110° to 140°C.

Where the process according to the invention is radically initiated by means of high-energy-radiation, best by UV-radiation, it has generally proved to be advantageous to maintain a temperature of from about 0° to 150°C and to apply radiation for a period of about 30 minutes to 5 hours.

When employed in the form of a chemical compound, the radical initiator is best used in a quantity of for example from 0.02 to 2 mols and preferably in a quantity of from 0.1 to 0.3 mol per mol of the alkenol or alkenyl ester.

In general, it is preferred to use alkenols instead of the corresponding alkenyl esters. In cases where alkenyl esters are used, which is necessary for example when vinyl acetate, 1-propen-2-yl-acetate or 1-buten-2-yl-acetate is used, the reaction mixture is hydrolysed on completion of the reaction with the radical initiators and following separation of the excess cyclic ketone, for which purpose an alcoholic solution of an alkali hydroxide such as sodium or potassium hydroxide in methanol, is best added to the reaction mixture, the reaction mixture is heated to about 60° to 100°C over a period of about 1 to 4 hours. Thereafter the alcoholic solvent is removed again and the reaction mixture washed until neutral.

The addition of the acid catalyst to the reaction mixture in the process according to the invention is made after the starting components have been reacted, after the excess cyclic ketone has been separated off and after hydrolysis, if any. Examples of suitable acid catalysts include mineral acids, organic sulphonic acids, Lewis acids or acid solid catalysts. It is preferred to use phosphoric acid, polyphosphoric acid, hydrochloric acid, hydrobromic acid, sulphuric acid, benzene sulphonic acid, toluene sulphonic acid, naphthalene sulphonic acid, methyl sulphonic acid, acid silica gel, acid ion exchangers and acid fuller's earth.

In general, it has proved to be advantageous to use approximately 0.01 to 5% by weight of the acid catalyst, based on the total quantity of reaction mixture present, and preferably about 0.1 to 1.1% by weight.

It has proved to be of particular advantage to use phosphoric acid as the acid catalyst.

The reaction mixture is expediently treated according to the invention with the acid catalyst by 5 to 30 minutes heating to about 90° to 150°C.

The oxa-bicyclo alkenes obtained by the process according to the invention can be separated off for example by means of fractional distillation under reduced pressure.

The process according to the invention can be carried out, for example, by mixing the two reactants and the radical initiator while stirring in a pressureless reaction vessel, equipped with a stirring mechanism, a metering unit and a reflux condenser, and subsequently heating the resulting reaction mixture for a few hours to the reaction temperature. However, it is generally of greater advantage to add the olefin components and the radical initiator to the cyclo alkanone at the reaction temperature over a fairly prolonged period, for example over a period of from 1 to 20 hours and preferably from 4 to 10 hours.

To this end, the alkenol or the alkenyl ester and the radical initiator can simultaneously be introduced slowly through separate feed pipes into the reaction vessel containing the cyclo alkanone, although it is also possible to add the alkenol or the alkenyl ester in admixture with the radical initiator to the cyclo alkanone. In the interests of better handling, the mixture of alkenol or alkenyl ester and radical initiator can also be diluted with about 1 to 2 equivalents (based on the alkenol or alkenyl ester used) of the cyclo alkanone and the mixture introduced into the cyclo alkanone during the reaction period.

It is occasionally advantageous, in order to obtain a uniform reaction, initially to introduce the cyclo alkanone into the reaction vessel together with part, for example from 2 to 20% and preferably 5 to 10%, of the alkenol or alkenyl ester, to heat the mixture to the reaction temperature and thereafter to introduce the rest of the alkenol or alkenyl ester and radical ester in the manner described above.

It is surprising that, where alkenols are used, the process according to the invention can be carried out in the absence of a solvent because normally cyclizing reactions are carried out in solvents. Another surprising factor is that the chemical additions of the cyclo alkanone to the olefin component can even be carried out with a small excess of from 4 to 6 mols of cyclo alkanone whereas, in normal radical-initiated or UV-initiated reactions involving the addition of a ketone to an olefin, a large excess of the ketone, amounting to about 10 to 100 mols. is always required in order to suppress undesired secondary reactions (for example DAS 1,172,251; Z. Chem. 4, 177–180 (1964).

The oxa-bicyclo alkenes obtained by the process according to the invention can be used, for example, as odorants and as intermediate products in the preparation of odorants, for example in the production of the macro-cyclic lactones corresponding to the oxa-bicyclo alkenes (for example penta-decanolides or alkyl-substituted penta-decanolides) with the same number of carbon atoms in accordance with DOS No. 2,026,056.

The following examples are illustrative.

EXAMPLE 1

A mixture of 174.2 g (3 mols) of allyl alcohol (1-propen-3-ol) and 70 g of di-tert.-butyl peroxide (=DTBP) was introduced at 140° to 150°C over a period of 6 hours into 2188 g (12 mols) of cyclododecanone. The temperature was kept at 140° to 150°C during the addition and for another 2 hours thereafter. The unreacted cyclododecanone (1810 g) was then separated off by distillation. 5 g of acid fuller's earth (Tonsilko, a Bayer product) were added and the residue was distilled through a 50 cm long Vigreux column under a vacuum of 1 mm Hg. In this way, it was possible to isolate a total of 290 g of 13-oxa-bicyclo [10.4.0] hexa-1-(12)-decene with a boiling point of b.p. = 115/1 mm Hg, a density $D_4^{20} = 0.975$ and a refractive index $n_D^{20} = 1.5079$.

EXAMPLE 2

2734 g (15 mols) of cyclododecanone were reacted over a period of 6 hours at 140°–150°C with 174 g (3 mols) of allyl alcohol and 70 g of DTBP, and the reaction mixture was left to react for another 3 hours. Thereafter 2305 g of excess cyclododecanone were distilled off and the residue was heated to 100°–120°C with 1 g of phosphoric acid in a water jet vacuum, approximately 32 g of water being eliminated. A total of 378 g of 13-oxa-bicyclo [10.4.0] hexa-1-(12)-decene was isolated from the reaction mixture by distillation in vacuo. The yield, based on the cyclododecanone reacted, comprised 72.4% of the theoretical yield.

EXAMPLE 3

2734 g (15 mols) of cyclododecanone were reacted as described in Example 2 with 250g (2.5 mols) of allyl acetate (1-propen-3-yl-acetate) instead of with 174 g of allyl alcohol. Excess cyclododecanone was separated off from the reaction mixture by fractional distillation and the product formed during the reaction was then hydrolyzed. Hydrolysis was carried out by boiling under reflux for 4 hours in 800 ml of methanol with 120 g of 50% sodium hydroxide solution. The methanol was then distilled off, accompanied by the addition of 500 ml of water, the product washed until neutral and the organic phase separated off. 1 g of phosphoric acid was added to the organic phase and the reaction mixture subjected to fractional vacuum distillation as in Example 1. 13-oxa-bicyclo [10.4.0] -hexa-1-(12)-decene was obtained in a yield of 288 g (56.4% of the theoretical, based on the cyclododecanone reacted) at b.p. 112–115/1 mm Hg.

EXAMPLE 4

Following the procedure described in Example 3, 2734 g of cyclododecanone were reacted at 140° to 110°C with 250 g (2.5 mols) of allyl acetate and 120 g of benzoyl peroxide instead of with di-tert.-butyl peroxide.

The acetate was then hydrolyzed as described in Example 3.1 ml of phosphoric acid was added, and the resulting mixture was distilled through a Vigreux column to give 104 g of 13-oxa-bicyclo [10.4.0] hexa-1-(12)- decene (27.4% of the theoretical yield, based on the cyclododecanone reacted).

EXAMPLE 5

2188 g (12 mols) of cyclododecanone, 5 g of DTBP and 14 g (0.2 mol) of 3-buten-1-ol were initially introduced into the reaction vessel. This was followed by the addition over a period of 6 hours at 140° to 150°C of 130 g (1.8 mols) of 1-buten-4-ol and 60 g of DTBP, after which the reaction mixture was left to react for another 2 hours at 140°–150°C. The excess cyclododecanone was distilled off (1878 g), 1 g of phosphoric acid added to the residue, the mixture heated until no more water was given off and then distilled. Fractional distillation gave a total of 236 g of 13-oxabicyclo [10.5.0] hepta-1-(12)-decene, corresponding to 58.7% of the theoretical yield, based on the cyclododecanone reacted.

Boiling point: b.p. = 118°C/0.6 mm Hg, density $D_4^{20}$ = 0.972

Refractive index: $n_D^{20}$ = 1.5060.

EXAMPLE 6

Quantities and procedure were as in Example 5 but using (0.2 +1.8) mols of 1-buten-3-ol instead of (0.2 + 1.8) mols of 1-buten-4-ol.

Yield: 155 g of 13-oxa-14-methyl-bicyclo [10.4.0] hexa-1-(12)-decene, corresponding to 43% of the theoretical yield, based on the cyclododecanone reacted.

Boiling point: b.p. = 109°–110°C/0.5 mm Hg,
Density: $D_4^{20}$ = 0.957,
Refractive index: $n_D^{20}$ = 1.4997.

EXAMPLE 7

Quantities and procedure were as in Example 5, but using (0.2 + 1.8) mols of 2-methyl-1-propen-3-ol instead of (0.2 + 1.8) mols of 1-buten-4-ol.

Yield: 222 g of 13-oxa-15-methyl-bicyclo [10.4.0] hexa-1-(12)-decene, corresponding to 55.6% of the theoretical yield, based on the cyclododecanone reacted.

Boiling point: b.p. = 108°–110°C/0.3 mm Hg, density $D_4^{20}$ = 0.960,
Refractive index: $n_D^{20}$ = 1.5016.

EXAMPLE 8

Quantities and procedure were as in Example 5, but using (0.2 + 1.8) mols of 2-methyl-1-buten-3-ol instead of (0.2 + 1.3) mols of 2-methyl-1-buten-4-ol.

Yield: 152 g of 13-oxa-14,15-dimethyl-bicyclo [10.4.0] hexa-1-(12)-decene, corresponding to 39% of the theoretical yield, based on the cyclododecanone reacted.

Boiling point: b.p. = 132 – 137°C/1mm Hg,
Density: $D_4^{20}$ = 0.962,
Refractive index: $n_D^{20}$ = 1,4990.

The product was in the form of a mixture of the cis- and trans-isomers.

EXAMPLE 9

Quantities and procedure were as in Example 5, but using (0.2 + 1.8) mols of 1-penten-3-ol instead of (0.2 + 1.8) mols of 1-buten-4-ol.

Yield: 204 g of 13-oxa-14-ethyl-bicyclo [10.4.0] hexa-1-(12-decene, corresponding to 48.2% of the theoretical yield, based on the cyclododecanone reacted.

Boiling point: b.p. = 115°–117°C/0.3 mm Hg,
Density: $D_4^{20}$ = 0.953,
Refractive index: $n_D^{20}$ = 1.4986.

EXAMPLE 10

2188 g (12 mols) of cyclododecanone, 5 g of DTBP and 20 g (0.156 mols) of 2-methyl-1-buten-4-yl-acetate were initially introduced into the reaction vessel, followed by the addition over a period of 6 hours at 140° to 150° C of 236 g (1.84 mols) of 2-methyl-1-buten-4-yl-acetate and 60 g of DTBP. The reaction mixture was then left to react for another 2 hours at 140° to 150° C. 1830 g of cyclododecanone were recovered by fractional distillation, 188 g of a fraction being obtained at 165°–172° C/0.5 mm Hg. This fraction was hydrolyzed as in Example 3 by boiling for 4 hours with methanolic sodium hydroxide. The methanol was distilled off accompanied by the addition of water, the oil taken up in toluene, washed until neutral and 2 g of phosphoric acid were added. The reaction mixture was subjected to fractional distillation as in Example 1.

Yield: 145 g of 13-oxa-16-methyl-bicyclo [10.5.0]-hepta-1-(12)-decene, corresponding to 29.5% of the theoretical yield, based on the cyclododecanone reacted.

Boiling point: b.p. 129°–130°C/0.6 mm Hg,
Density: $D_4^{20}$ = 0.955,
Refractive index: $n_D^{20}$ = 1.5028.

EXAMPLE 11

53 g (0.915 mol) of allyl alcohol and 23 g of DTBP were added over a period of 6 hours at 140°–150°C to 850 g (5.05 mols) of cycloundecanone, 5g (0.085 mol) of allyl alcohol and 2 g of DTBP, and the mixture was left to react for another 2 hours at 140° to 150°C. 740 g of excess cyclo-undecanone were separated off, 0.5 g of phosphoric acid added to the residue and the reaction product was recovered by fractional distillation under reduced pressure.

Yield: 62 g of 12-oxa-bicyclo [9.4.0]-penta-1-(11)-decene, corresponding to 45.5 % of the theoretical yield, based on the cyclodecanone reacted.

Boiling point: b.p. = 93°–95°C/0.5 mm Hg,
Density: $D_4^{20}$ = 0.985,
Refractive index: $n_D^{20}$ = 1.5083.

EXAMPLE 12

12 g (0.2 mol) of allyl alcohol and 6 g of DTBP were added dropwise over a period of 5 hours at 145°–150°C to 200 g (0.9 mol) of cyclopentadecanone, and the mixture was left to react for 2 hours. 172 g of cyclopentadecanone were recovered from the reaction mixture by distillation. 0.2 g of phosphoric acid was added to the reaction mixture, followed by fractional distillation.

Yield: 18 g of 16-oxa-bicyclo [13.4.0]-nona-1-(15)-decene, corresponding to 54.6% of the theoretical yield, based on cyclopentadecanone.

Boiling point: b.p. = 135°–136°C/0.4 mm Hg,
Density: $D_4^{20}$ = 0.955,
Refractive index: $n_D^{20}$ = 1.5028.

EXAMPLE 13

235 g (2.73 mols) of vinyl acetate and 55 g of di-tert.-butyl peroxide were added over a period of 5 hours at 140° to 150° C to 2730 g (15 mols) of cyclododecanone, and the mixture was left to react for 2 hours at the same temperature. The reaction mixture was subjected to fractional distillation to recover 2258 g of unreacted cyclododecanone. The product formed during the reaction was hydrolyzed. Hydrolysis was carried out by boiling under reflux for 4 hours with a mixture of 600 ml of methanol and 190 g of 50% sodium hydroxide. The methanol was then distilled off, accompanied by the addition of 200 ml of water, the product washed until neutral and the organic phase separated off. 0.5 g of phosphoric acid were added to the organic phase and the reaction mixture was subjected to fractional distillation as in Example 1.

Yield: 218 g of 13-oxa-bicyclo [10.3.0]-penta-1-(12)-decene.
Boiling point: b.p. = 98°–100°C/0.6 mm Hg,
Density: $D_4^{20} = 0.975$,
Refractive index: $n_D^{20} = 1.5040$.

EXAMPLE 14

Quantities and procedure were as in Example 13, but using 240 g (2.4 mols) of isopropenyl acetate (1-propen-2-yl-acetate) instead of 225 g (2.73 mols) of vinyl acetate. 2305 g of cyclododecanone were recovered by distillation which also gave 477 g of a fraction boiling at 130°–172°C/0.3 mm Hg. This fraction was hydrolyzed as in Example 12 with a mixture of 600 ml of methanol and 190 g of 50% sodium hydroxide, washed until neutral and the reaction mixture distilled in vacuo following the addition of 0.5 g of phosphoric acid.

Yield: 268 g of 14-methyl-13-oxa-bicyclo [10.3.0]-penta-1-(12)-decene, corresponding to 51.6% of the theoretical yield, based on the cyclododecanone reacted.
Boiling point: b.p. 90°–92°C/0.4 mm Hg,
Density: $D_4^{20} = 0.958$.
Refractive index: $n_D^{20} = 1.4953$.

It will be understood that the specification and examples are illustrative but not limitative of the present invention and that other embodiments within the spirit and scope of the invention wil suggest themselves to those skilled in the art.

What is claimed is:

1. Process for the production of an oxa-bicyclo alkene compound of the formula $$\begin{array}{c} \phantom{xxx}C - CH_2 - CH\text{-}R_1 \\ (CH_2)_n \phantom{xxxxx} \| \phantom{xxxxx} (CH\text{-}R_2)_m \\ \phantom{xxx}C - O - (CH\text{-}R_3)_p \end{array}$$

which process comprises reacting in 1 to 20 hours at 40° to 200°C. a cycloalkanone of from 11 to 15 ring carbon atoms with an alkene compound of the formula $$CH_2 = \overset{R_1}{\underset{|}{C}} - [\overset{R_2}{\underset{|}{CH}}]_m - [\overset{R_3}{\underset{|}{CH}}]_p - OR_4$$

wherein
  $R_1$, $R_2$ and $R_3$ are individually hydrogen, methyl or ethyl;
  $m$ and $p$ are individually 0 or 1;
  $R_4$, when m and p are both 0, is a lower aliphatic carboxylic acid radical, or when one of $m$ and $p$ is 1, is hydrogen or a lower aliphatic carboxylic acid radical;

in the presence of a radical initiator, separating the excess cycloalkanone following completion of said reaction, when $R_4$ is a lower aliphatic carboxylic acid radical hydrolyzing the reaction mixture with an alcoholic solution of an alkali hydroxide, and subsequently treating the reaction mixture with 0.01 to 5% by weight of an acid catalyst selected from the group consisting of mineral acids, organic acids, Lewis acids or acid solid catalysts for about 5 to 30 minutes at about 90° to 150° C. to form said oxa-bicyclo alkene cmpound.

2. Process as claimed in claim 1 wherein $R_4$ is a lower aliphatic carboxylic acid radical and wherein the reaction mixture is hydrolyzed after said separating step.

3. Process as claimed in claim 1 wherein said oxa-bicyclo alkene compound is recovered from the reaction mixture.

4. Process as claimed in claim 1 wherein the total sum of the carbon atoms of said cyclic ketone and the linear carbon atoms of said alkene compound is from 14 to 16.

5. Process as claimed in claim 4 wherein said sum is 15.

6. Process as claimed in claim 1 wherein said cyclic ketone is cyclododecanone.

7. Process as claimed in claim 6 wherein the said alkene compound has three linear carbon atoms.

8. Process as claimed in claim 1 wherein said alkene compound is 1-propen-3-ol, 2-methyl-1-propen-3-ol, 1-buten-3-ol, 1-propen-3-yl-acetate, 2-methyl-1-propen-3-yl-acetate or 1-buten-3-yl-acetate.

9. A process as claimed in claim 1 wherein 1.5 to 10 mols of cyclo alkanone are used per mol of the compound of general formula I.

10. A process as claimed in claim 1 wherein the radical initiator is used in quantities of from about 0.1 to 0.3 mol per mol of alkenol or alkenyl ester.

11. A process as claimed in claim 1 wherein di-tert.-butyl peroxide is used as the radical initiator.

12. A process as claimed in claim 1 wherein the reaction is carried out at temperatures of from 120° to 200°C.

13. A process as claimed in claim 1 wherein said acid catalyst is phosphoric acid, polyphosphoric acid, hydrochloric acid, hydrobromic acid, sulphuric acid, benzene sulphonic acid, toluene sulphonic acid, naphthalene sulphonic acid, methyl sulphonic acid, acid silica gel, acid ion exchangers or acid fuller's earth.

14. A process as claimed in claim 1 wherein phosphoric acid is used as the acid catalyst.

* * * * *

FO-1050
(5/69)

UNITED STATES PATENT OFFICE
CERTIFICATE OF CORRECTION

Patent No. 3,856,815     Dated December 24, 1974

Inventor(s) Rudolf Hopp and Kurt Bauer

It is certified that error appears in the above-identified patent and that said Letters Patent are hereby corrected as shown below:

Col. 1, line 21, after the structural formula insert -- (I) --.

Col. 1, line 44, cancel "(1)" and substitute -- (I) --.

Col. 2, line 24, after "acetate" - second occurrence, cancel period " . " and substitute a comma -- , --.

Col. 2, line 37, after "formula" insert -- I --.

Col. 6, line 66, after "3", cancel the period " . " and substitute a comma -- , --.

Col. 7, line 49, cancel "1.3" and substitute -- 1.8 --.

Col. 7, line 66, after "(12" insert -- ) --.

Col. 9, line 38, correct spelling of "will".

Col. 9, claim 1, at end of second structural formulae, insert designation -- (I) --.

Signed and sealed this 24th day of June 1975.

(SEAL)
Attest:

RUTH C. MASON
Attesting Officer

C. MARSHALL DANN
Commissioner of Patents
and Trademarks